June 14, 1949.   F. N. DICKERMAN   2,473,139
PISTON ROD PACKING LUBRICATOR
Filed Nov. 7, 1945

INVENTOR.
Fred N. Dickerman
BY M. B. Tasker
ATTORNEY.

Patented June 14, 1949

2,473,139

UNITED STATES PATENT OFFICE 2,473,139

PISTON ROD PACKING LUBRICATOR

Fred N. Dickerman, Nichols, Conn., assignor to United Aircraft Corporation, East Hartford, Conn., a corporation of Delaware Application November 7, 1945, Serial No. 627,110

5 Claims. (Cl. 286—17)

This invention relates to hydraulic struts of the type used in aircraft and particularly to improvements in lubrication of the piston rods of such struts.

Hydraulic struts used in aircraft, for example, to operate retractable landing gear, are provided with a metallic, usually bronze, annular wiper ring which is loosely mounted at the outermost end of the cylinder cap but which has its inner diameter fitted to the piston rod for a tight sliding fit thereon. The function of this wiper ring is to remove any dust or other dirt which may have accumulated on the piston rod during the period it has been withdrawn from the cylinder as the rod is returned to the cylinder. Unfortunately, in removing dust and other foreign particles from the surface of the piston rod, the wiper ring also removes the film of lubricating oil on the piston rod surface so that the rod is dry as it passes through the cylinder cap into the cylinder, and the rubber O ring packing seal in the cylinder cap cleaves to the dry piston rod surface. This sticking of the rubber packing to the piston rod surface prevents efficient operation of the strut, greatly shortens the life of the packing and frequently causes an immediate leak.

It is an object of this invention to provide automatic lubrication of the surface of hydraulic strut piston rods between the wiper ring and the O ring packing as the piston rod returns into the cylinder.

Another object of the invention is to provide automatic lubricating means for the piston rods of hydraulic struts utilizing oil under pressure from within the cylinder of the strut.

A further object of the invention is generally to improve the construction and operation of hydraulic struts.

These and other objects and advantages of the invention will be apparent from the following detailed description of one embodiment of the invention which has been shown for purposes of illustration in the accompanying drawings.

In these drawings.

Figure 1:
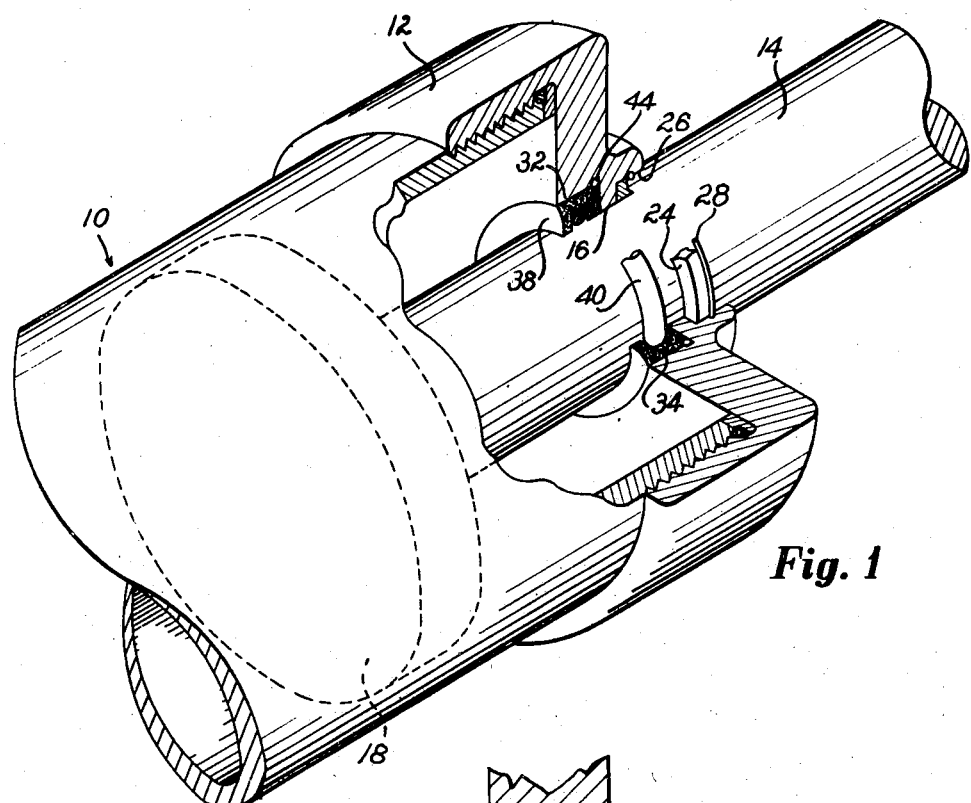
Fig. 1 is a fragmentary perspective view partly in section of the cap and piston rod of a hydraulic strut having the improved lubricating means of the invention between the wiper ring and the O ring packing.
Figure 2:
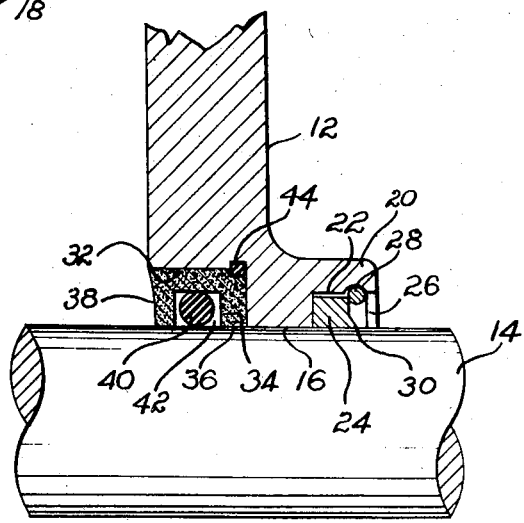
Fig. 2 is an enlarged sectional view of a portion of the cap of Fig. 1.

In Figs. 1 and 2, 10 represents the hydraulic cylinder and 12 the cap of a hydraulic strut commonly used in aircraft for operating retractable landing gear or for moving various control surfaces. A piston rod 14 extends through an axial passage 16 in the cap 12 and terminates in a piston 18 within the cylinder. The cap 12 has an annular flange 20 provided with an axial recess 22 in which the usual annular bronze wiper ring 24 is loosely received. The cap 12 also has an outer annular flange 26 formed by annular groove in the passage 16 and in the groove behind it a resilient locking ring 28 is disposed which holds the wiper ring 24 against displacement in the recess.

While the outer diameter of ring 24 is somewhat smaller than the diameter of recess 22, its internal diameter is a tight sliding fit on the external diameter of the piston rod 14. The ring 24 is further provided with a feather wiping edge 30 in a usual manner which enables this ring to remove all foreign particles from the surface of the piston rod as the latter is moved into the cylinder.

In accordance with the present invention automatic lubricating means are provided for supplying lubricant to the piston rod surfaces between the wiping ring 24 and the O ring packing which provides the hydraulic seal between the piston rod and the cylinder cap for preventing leakage of the hydraulic fluid in the cylinder, which may be under high pressure, through the passage 16 around the rod 14.

To this end, an annular recess 32 is provided in the cylinder cap passage 16 at the inner end of this passage into which is pressed an annular porous metallic bushing 34 which has an inner bearing surface 36 of the same diameter as the passage 16 through which the piston 14 reciprocates. The end wall 38 of the porous bushing 34 is exposed to the high pressure fluid which is admitted to the cylinder on the rod side of the piston 18 during the return stroke of the piston and rod into the cylinder. Adjacent the inner end of bushing 34 the usual O ring packing 40 is provided which as usual comprises a rubber or rubber-like annular ring of circular cross-section which is received in an annular recess 42, the depth of which is slightly less than the diameter of the cross-section of the ring, and the length of which is considerably greater than this diameter so that the ring as a result of piston movements in opposite directions is caused to roll along the length of the recess thus providing a beneficial kneading action to the rubber.

The porosity of the metallic bushing 34 is so designed that the oil admitted under pressure to the cylinder 10 on the cap side of the piston penetrates through the pores of this bushing very slightly but sufficiently to exude enough oil on the surface 36 exteriorly of the packing ring 40 to spread a very thin film of lubricating oil on the piston rod surface which has been wiped dry by the ring 24 before this surfaces engages the O ring 40. It will be understood that the quantity of oil which reaches the surface 36 is only sufficient to provide a very thin surface film of lubricant to the piston rod during the "in" stroke of the latter when the rod surface is dry, and this only when actuating hydraulic fluid is admitted to the cap side of the piston, the pressure of oil on the surface 38 on the "out" stroke of the piston being negligible and not sufficient to force oil through the very minute pores in the bushing 34. For example, if the hydraulic pressure admitted to the cylinder for the retraction of a landing gear strut were of the order of 600 p. s. i., the bushing 34 would be designed for such a strut so that with this pressure acting on the surface 38 the oil transmitted through the pores of the metal would cause "sweaing" at the surface 36 but oil would never be discharged from this surface except by being wiped onto the piston rod as it moves over the surface. To prevent the possibility of a greater flow of oil than is desired at the junction of the porous metallic bushing 34 and the wall of the recess in cap 12, it may be desirable to insert an annular packing 44 in the recess 32 at some point along the junction of the two surfaces which will be permanently compressed when the bushing 34 is pressed into the recess.

The bushing 34 can be made of various substances but preferably it is made of a powdered metallic substance compressed into a unit of predetermined density, the degree of compression and the resulting porosity being determined by the nature of the material and the size of the discrete particles prior to compression, the pressure of the oil to which the unit is to be subjected, and to some extent the viscosity of the oil used in the strut.

It will be evident that as a result of this invention a very simple and efficient means has been provided for automatically lubricating the surface of a hydraulic piston rod by reason of which the critical problem of sticking of the O ring packing to the piston rod surface has been entirely eliminated. It will further be evident that this automatic lubrication has been accomplished by the utilization of oil available under pressure within the hydraulic cylinder of the strut but only during the piston stroke when lubrication is needed, with the result that servicing of the packing in such hydraulic struts has been greatly simplified and the operation of these struts has been greatly improved.

While one embodiment of the invention has been shown and described which is at present the preferred embodiment, it will be understood that various changes in the construction and arrangement of the parts may be made without departing from the scope of the invention as defined in the following claims.

What I desire to secure by U. S. Letters Patent is as follows:

1. A hydraulic strut having a cylinder cap and a piston rod reciprocable in a passage in said cap, said piston rod being reciprocable in response to fluid under pressure in said strut, a fluid-tight packing between said cap and rod for sealing said passage around said rod, wiping means carried by said cap for wiping the surface of said piston rod as the latter moves into the cylinder prior to its engagement with said packing, and means operative during movement of said rod into the cylinder for applying portions of said fluid as a lubricant to the wiped surface of said rod prior to its contact with said packing.

2. A hydraulic strut including a cylinder adapted to contain oil under pressure and having a cylinder cap and a piston rod reciprocable in a passage in said cap, a fluid-tight packing between said cap and rod for sealing said passage around said rod, wiping means carried by said cap for wiping the surface of said piston rod as the latter moves into said cylinder prior to its engagement with said packing, and means utilizing the pressure of the oil in said cylinder for supplying a limited quantity of oil from said cylinder to the wiped surface of said rod prior to its contact with said packing.

3. A hydraulic strut including a cylinder adapted to contain oil under pressure and having a cylinder cap and a piston rod reciprocable in a passage in said cap, a fluid-tight packing between said cap and rod for sealing said passage around said rod, wiping means carried by said cap for wiping the surface of said piston rod as the latter moves into the cylinder prior to its engagement with said packing, and means including a body of porous material disposed between the oil under pressure in said cylinder and said wiped surface for lubricating the latter with oil from said cylinder prior to contact of said surface with said packing.

4. A hydraulic strut including a cylinder adapted to contain high pressure oil and having a cylinder cap and a piston rod reciprocable in a passage in said cap, a fluid-tight packing between said cap and rod for sealing said passage around said rod, wiping means carried by said cap for wiping the surface of said piston rod as the latter moves into the cylinder prior to its engagement with said packing, and means for lubricating said wiped surface including a sleeve of material of predetermined porosity surrounding and having wiping engagement with said rod between said packing and said wiping means and having a surface thereof exposed to the high pressure oil in the cylinder as said piston is moved into the latter.

5. A hydraulic strut including a cylinder adapted to contain oil under pressure and having a cylinder cap and a piston rod reciprocable in a passage in said cap, a fluid-tight packing between said cap and rod for sealing said passage around said rod, wiping means carried by said cap for wiping the surface of said piston rod as the latter moves into the cylinder prior to its engagement with said packing, and means for lubricating the surface of said rod between said packing and said wiping means prior to engagement of said surface with said packing including a sleeve of material of predetermined porosity surrounding said rod between said packing and said wiping means and also having a surface portion thereof in fluid communication with the oil under pressure in said cylinder during the movement of said piston rod into said cylinder.

FRED N. DICKERMAN.

REFERENCES CITED

The following references are of record in the file of this patent:

UNITED STATES PATENTS

| Number | Name | Date |
|---|---|---|
| 760,686 | Furlow | May 24, 1904 |
| 1,010,498 | Hultgren | Dec. 5, 1911 |
| 1,992,746 | Fortune | Feb. 26, 1935 |
| 2,071,198 | Chambers | Feb. 16, 1937 |
| 2,368,137 | Harmon | Jan. 30, 1945 |
| 2,394,364 | Christensen | Feb. 5, 1946 |

FOREIGN PATENTS

| Number | Country | Date |
|---|---|---|
| 699,737 | Germany | 1940 |

OTHER REFERENCES

Product Engineering, Sept. 1944, page 584, 286-26 (1.1).